3,531,537
BENZENE BY HYDRODEMETHYLATION OF TOLUENE IN FIRED COIL WITH QUENCH AND ZONED HEAT FLUX
Randlow Smith and Dale Williams, Houston, Tex., assignors to Texaco Inc., New York, N.Y., a corporation of Delaware
Continuation-in-part of abandoned application Ser. No. 636,359, May 5, 1967. This application June 30, 1969, Ser. No. 848,132
Int. Cl. C07c 3/00, 3/58; C10g 9/16
U.S. Cl. 260—672                                    10 Claims

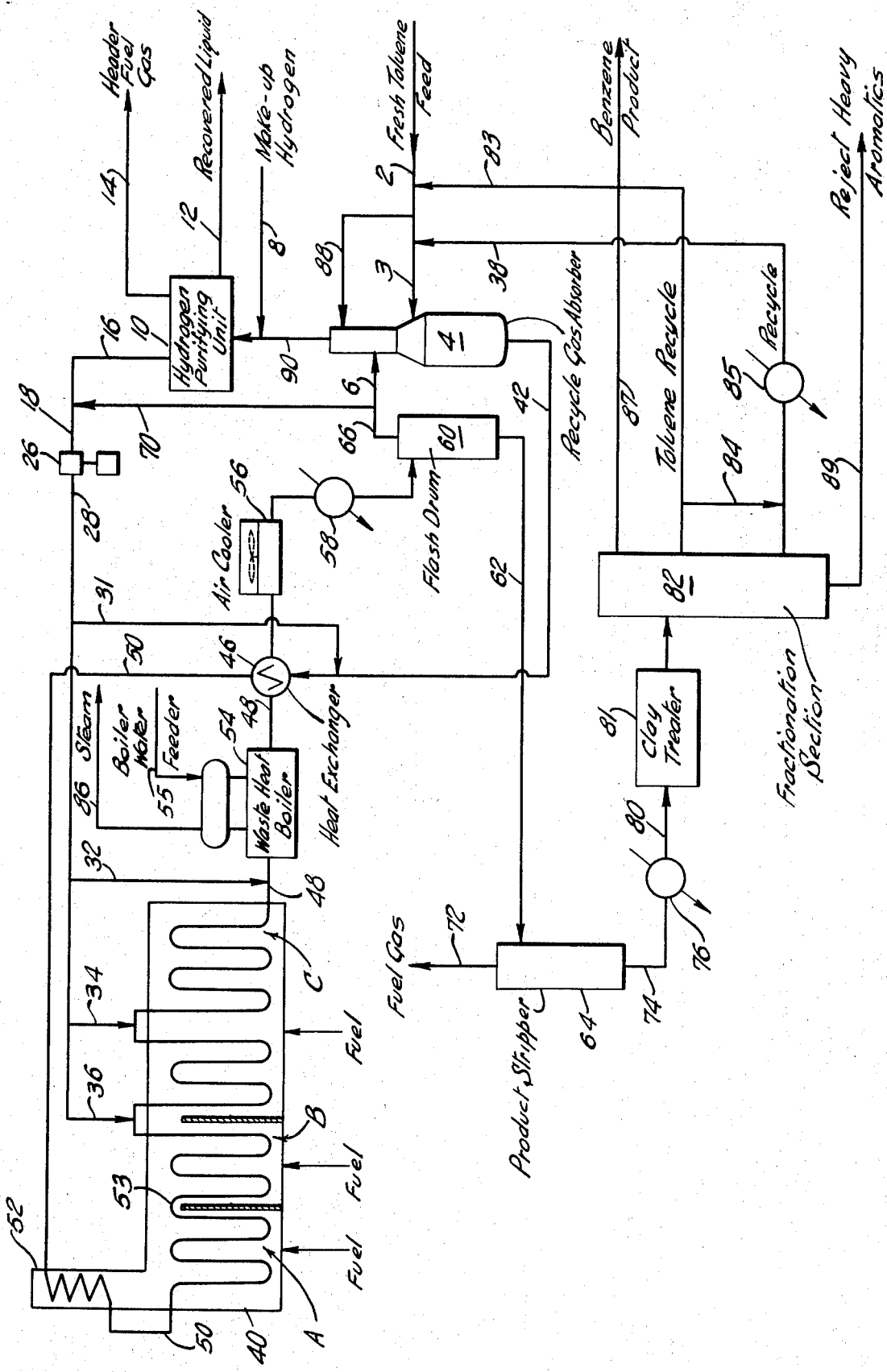

ABSTRACT OF THE DISCLOSURE

This invention relates to the preparation of an aromatic compound. Benzene and methane are prepared by non-adiabatic thermal dealkylation of a mixture of hydrogen and toluene in a series of three heating zones. In the first zone an average heat flux of 12,000–20,000 B.t.u./hr./ft.$^2$ brings the mixture up to the reaction initiation temperature. In the second zone a heat flux of 200–500 B.t.u./lb.-mole/sec. augments the exothermic heat reaction producing a reaction mixture temperature of 1325–1425° F. A hydrogen quench reduces the temperature of the mixture to 1250–1350° F. before it passes into the third zone where a heat flux of 50–250 B.t.u./lb.-mole/sec. combined with hydrogen quench at one or more points maintains a reaction temperature of 1250–1425° F. Benzene selectivities in excess of 95% are obtained.

CROSS-REFERENCES TO RELATED APPLICATIONS

This is a continuation-in-part of application Ser. No. 636,359, filed May 5, 1967, now abandoned.

BACKGROUND OF THE INVENTION

The preparation of benzene from toluene is broadly old. Generally speaking, there are two methods which are commercially suitable for preparing benzene from toluene, i.e. the catalytic method and the thermal method. The thermal method is performed by passing a mixture of hydrogen and toluene into a heater to raise the temperature of the reactants to between about 1100 and 1500° F. The so-heated reactants are then passed into a reactor wherein the pressure on the reactants is maintained at a chosen value within a range, generally between about 300 p.s.i.g. and 1000 p.s.i.g. The hydrogen is present in at least a stoichiometric amount although in commercial practice it has been found that to prevent coking or decomposition of the methane so formed to coke, the hydrogen to toluene ratio should be substantially in excess of the stoichiometric amount. Generally, a hydrogen to toluene mol ratio of between 2 and 12 is suitable, especially between 4 and 6. In the reactor, the reactants are quenched at several locations, after reaction with hydrogen, to maintain control of the reaction as the reaction is extremely exothermic and temperature sensitive, and higher than desired temperatures and undue heat addition to the reactants could cause coke formation or cracking of the benzene so formed to less desirable aliphatic compounds with resultant loss of benzene. The reactants are withdrawn from the reactor and are processed in conventional manner. The selectivity of the reaction is about 90–98 i.e. the mols of benzene recovered bear a relationship to the mols of toluene disappearing of about 90–98%.

Selectivity is expressed as the number of mols of benzene recovered over the number of mols of toluene disappearing in the process times 100.

Small amounts of heavy aromatic compounds such as xylenes, biphenyl, methylbiphenyl, and heavier multiring compounds are unavoidably prepared in commercial operations. The biphenyls, however, are recycled according to the teachings of U.S. Pat. 2,929,775 to Aristoff et al., entitled "Hydrocarbon Conversion with Substantial Prevention of Coke Formation During the Reaction" of Mar. 22, 1960, after separation from the benzene. The bulk of the biphenyls are recycled after removing a small reject stream of the heaviest aromatic compounds which are separated as by distillation. The recycling of the biphenyls retards formation of additional biphenyls by the law of mass action and can be thusly utilized to advantage. Any xylenes formed can also be similarly recycled, or withdrawn for other use.

The unreacted hydrogen gas is also recovered and recycled to the reaction either with the toluene feed to the heater inlet or as quench gas into the reaction zone. Any unreacted toluene provided by the process can also be recycled by mixing with the fresh toluene feed or with say the biphenyl recycle.

It is obvious to one skilled in the art that a thermal hydrodealkylation process of toluene to benzene should be efficient from a selectivity standpoint or it will not be commercially feasible. Specifically, while the reaction proceeds to a high percentage of completion compared to many organic chemistry reactions, to be commercially feasible the selectivity should be as high as is possible, preferably greater than 95, as the degradation products have little value relative to the value of either the toluene feed or the benzene product. It is also apparent, that since the reaction is highly exothermic and excessive temperatures endanger the selectivity, that it is most desirable to provide a process which controls the heat input to the reactants, suppresses gas and coke formation, and minimizes the production of undesirable heavy aromatic compounds. It is also apparent that such a process must, to be economically valuable, be capable of being performed in available or easily constructed apparatus without entailing excessively expensive equipment and economically unfeasible methods for limiting or controlling the temperature throughout the reaction zone. Heretofore, the major portion of thermal dealkylation reactions have generally been performed in equipment having one or more of the following costly characteristics: (a) relatively long residence time, (b) relatively low length to diameter ratio, (c) complex arrangements for control of temperature and/or heat flux.

OBJECTS OF THE INVENTION

It is an object of this invention, therefore, to provide a process for the thermal hydrodealkylation of an aromatic compound such as toluene or xylene.

It is another object of this invention, therefore, to provide a commercially feasible process for producing benzene from toluene.

It is still another object of this invention, therefore, to provide a commercially feasible process for producing benzene from toluene which provides a high selectivity of reaction and hence minimizes the production of unwanted heavy aromatic compounds as by-product.

It is still another object of this invention, therefore, to provide a process for the production of benzene from toluene which does not necessitate employment of unusually expensive and/or elaborate apparatus.

These and other objects of this invention will become more apparent from the following complete description of the invention, the appended drawing and claims.

SUMMARY OF THE INVENTION

This invention contemplates a process for producing benzene from toluene, xylene or ethylbenzene which comprises:

(1) passing toluene, xylene or ethylbenzene and hydrogen through a heating zone such as a fired tubular heater where the reactants are brought somewhat above the temperature necessary to initiate the reaction. This temperature is normally in the range of 1150° F. to 1325° F. Heater investment may be reduced by employing higher than normal average fluxes, such as 12–20,000 B.t.u./hr./ft.$^2$.

(2) passing the reaction mixture through a second heated reaction zone having a heat flux applied to the heater tubes containing the reaction mixture of between 200 and 500 B.t.u./lb.-mole/sec. for a period of between 2.0 and 4.0 seconds to increase the temperature of the reaction mixture to between 1325 and 1425° F.; and then quenching the reaction mixture with cold hydrogen to a temperature of between 1250 and 1350° F.

(3) passing the reaction mixture through a third heated reaction zone having a heat flux applied to the heater tubes containing the reaction mixture of between 50 and 250 B.t.u./lb.-mole/sec. for a period of between 3.5 and 5.0 seconds; and quenching the reaction mixture with cold hydrogen at one or more points within the zone as necessary to maintain the temperature between 1250 and 1425° F.

(4) withdrawing the reaction mixture from the third heated reaction zone, cooling, and recovering benzene.

In a particularly desirable embodiment of this invention the hydrogen to toluene, xylene or ethylbenzene mol ratio hereinafter referred to as the hydrogen to toluene mol ratio, in the feed to the first reaction zone is between 4 and 6 especially 5, the heat flux applied to the vessel containing the reaction mixture in the first heating zone is between 12,000 and 20,000 B.t.u./hr./ft.$^2$, and the reactants are heated to between 1250 and 1300° F., the heat flux applied to the heater tubes containing the reaction mixture in the second heated reaction zone is between 30 and 500 B.t.u./lb.-mole/sec, the period of passage of the reaction mixture through the second heated reaction zone is between 2.8 and 3.3 seconds and the temperature of the reaction mixture at the outlet of the second heated reaction zone is between 1350 and 1400° F. It is still further preferred that the heat flux applied to the heater tubes containing the reaction mixture in the third heated reaction zone be between 75 and 150 B.t.u./lb.-mole/sec., the period of passage of the reaction mixture through the third heated reaction zone be between 3.7 and 4.3 seconds and the temperatures of the reaction zone not exceed 1425° F. Suitably the make-up gas is 40–100 volume percent hydrogen, normally 75–85 volume percent hydrogen.

In order to more fully illustrate the nature of this invention and the manner of practicing the same, reference is made to the accompanying simplified flow diagram which illustrates a commercially feasible manner of practicing the invention.

Fresh toluene feed enters line 2 and passes into recycle gas absorber 4 to which is admitted hydrogen rich recycle gas from line 6. A portion of the toluene is utilized as a scrubbing fluid and enters recycle gas absorber 4 through line 88, while the balance enters through line 3. The make-up hydrogen rich gas originates from a source suitably in another area of say, a petroleum refining plant, such as from a catalytic reforming unit. The hydrogen make-up gas from the reforming unit or the like enters hydrogen feed line 8 and passes into a cryogenic hydrogen purification unit 10 via line 90. Recycle gas containing a small amount of benzene vapor is countercurrently contacted with that portion of the toluene entering recycle gas absorber 4 through line 88 thereby scrubbing the gas to prepare it for cryogenic purification. This reduces the high freezing point benzene concentration so that there is a sufficient ratio of low freezing point toluene to high freezing point benzene to prevent freezing of the cryogenic equipment. Scrubbed gas is routed to the hydrogen purification unit via line 90. Any hydrocarbon liquids recovered in the hydrogen purification unit can be routed to off-site fractionation facilities in line 12. The reject methane stream containing small amounts of hydrogen and light paraffins leave the hydrogen purification unit 10 and pass into fuel gas header line 14. The purified hydrogen leaves hydrogen purification unit 10 via line 16 and passes into line 18 where it mixes with any recycle gas that has bypassed the hydrogen purification unit. The hydrogen etc. then proceeds to a compresser 26 and continues in line 28. Line 28 feeds the recycle hydrogen line 31, as well as quench lines 34 and 36 and pressure balancing line 32.

There is also introduced into recycle gas absorber 4 via lines 38 and 3 a recycle stream which may contain all or part of the toluene and biphenyls separated from the benzene product in fractionation section 82. In the lower section of the recycle gas absorber 4 the fresh feed and recycle toluene, the recycle biphenyl, the benzene scrubbed from the recycle gas, and dissolved hydrogen and light paraffins are combined and pass out line 42. A quantity of hydrogen from hydrogen line 31 is admitted to line 42 in amount sufficient to adjust the ratio of hydrogen to toluene between say 4 and 6. The hydrogen is present in the gas stream from line 31 in volume percent between 40 and 100%. The reaction mixture continues through heat exchanger 46 in line 42 and exchanges heat with reaction mixture effluent leaving waste heat boiler 54 in line 48. The partially preheated reactants then pass via line 50 through convection section 52 which also serves as an economizer. The preheated reaction mixture in line 50 then enters radiant heat cell A of fired heater 40. In cell A the reactants are heated to slightly above the reaction temperature threshold, i.e. to between 1150 and 1325° F., preferably between 1250–1300° F. The hot reactants in line 50 then exit from cell A and pass through cell B within line 53. The heat flux applied to the heater tubes containing the reaction mixture in cell B is carefully maintained between 200 and 500 B.t.u./lb.-mole/sec. preferably between 300 and 400 B.t.u./lb.-mole/sec. and the duration of time for the passage is between 2 and 4 seconds. The resulting temperature of the reaction mixture in line 53 at the outlet of cell B is between 1325 and 1425° F. Upon egress from cell B the reaction mixture within line 53 is quenched with cold hydrogen entering via line 36 to a temperature of approximately 1250–1350° F. The so quenched reaction mixture then passes into cell C wherein the reaction mixture is carefully maintained at a temperature between 1250 and 1425° F., by applying heat flux to the heater tubes containing the reaction mixture in cell C of between 50 and 250 B.t.u./lb.-mole/sec., preferably between 75 and 150 B.t.u./lb.-mole/sec., and the duration of passage of the reaction mixture is designed to be between 3.5 and 5 seconds. Midway during passage of the reaction mixture through cell C of heater 40 there is admitted into line 53 sufficient hydrogen gas quench via line 34 to control the heater outlet temperature to the desired value of 1350 to 1400° F., preferably 1375° F. The reaction mixture effluent then passes into line 48 where it is mixed with hydrogen introduced from pressure balancing line 32. The temperature of the so quenched reaction mixture will normally be in the range of 1260–1325° F., usually about 1285° F. The reaction mixture effluent which now contains a large percentage of product, i.e. benzene, passes through waste heat boiler 54 and then passes through heat exchanger 46 thereby cooling the reaction mixture effluent and heating the reaction mixture in line 42 on its way to heater 40. The reaction mixture effluent then passes through an air cooler 56, then through another cooler 58 and enters flash drum 60. The reaction mixture effluent is separated therein and the liquid portion containing benzene, unreacted toluene, a small amount xylenes, biphenyls, and some other heavy aromatics pass out line 62 as bottoms and enter product stripper 64. Flash gas containing hydrogen, methane and some small quantities of light paraffins such as ethane pass out the top of flash drum 60 into line 66. Line 66 becomes divided into lines 6 and 70. Line 6 carries flash gas from line 66 into recycle gas absorber 4 for benzene removal and subsequent routing to the hydrogen purification unit 10. The flash gas rate through line 6 is adjusted as necessary to enable the methane rejection rate from the hydrogen purification unit to maintain the methane content of the recycle gas within the desired operating range. The excess flash gas passes through hydrogen purfication unit bypass line 70 and joins line 16 from hydrogen purification unit 10. This recycle gas mixture of flash gas and purified hydrogen continues to recycle compressor 26 in line 18 and is processed in accordance with the above disclosure. The liquid hydrocarbons entering product stripper 64 undergo further separation to remove dissolved hydrogen and normally gaseous hydrocarbons such as methane and ethane. The stripper off-gases leave product stripper 64 by line 72 and are routed to the fuel gas system.

Benzene containing the aforementioned heavier aromatic hydrocarbons passes out the bottom of product stripper 64, into line 74, through cooler 76, and into line 80. The liquid aromatics then are suitably clay treated in clay treater 81 using attapulgus clay and are then routed to the fractionation section 82 wherein the benzene product is separated from the higher boiling aromatics by conventional fractionation. The benzene is then withdrawn as a liquid sidecut in line 87 for further processing etc. or for shipment. The toluene is withdrawn as a liquid sidecut and recycled in line 83 to toluene feed line 2. A biphenyl cut rich in biphenyl and methylbiphenyls is withdrawn as a vapor sidecut, condensed by passing through condenser 85 and recycled via lines 38 and 3 to recycle gas absorber 4. Note that it is desirable to inject sufficient toluene through line 84 into the biphenyls vapor to prevent solidification of this high melting point material upon cooling. Bottoms containing heavier aromatics are removed as a tower bottoms stream. As stated above, the presence of biphenyls in the reaction mixture retards further biphenyls formation and accordingly helps to increase the selectivity of the reaction and the efficiency of the overall process. The biphenyls are continuously recycled together with the toluene. No fresh biphenyls are added or need be added to the reaction mixture in the process. In so doing, there is only a small net production of heavy aromatics. Heavy aromatics are rejected in line 89 as bottoms from fractionator 82.

The stream produced by the heat exchange from the waste heat boiler 54 passes through line 86 as high pressure steam and can be used appropriately to provide mechanical energy in another area of the plant, etc. Boiler feed water enters waste heat boiler 54 through inlet pipe 55.

By performing the process of the instant invention in accordance with the teachings herein, a selectivity upwards of 95 can be achieved and this can be accomplished without utilization of apparatus which entail initial high capital outlay. The high length to diameter ratio fired heater 40 equipped with the described simple dual quench points readily provides the desired temperature gradient and heat flux gradient to control the highly exothermic reaction, suppress coke formation, and minimize the loss of the benzene to nonselective reactions.

It is to be realized that in performing the process of the instant invention, the observance of some of the parameters set forth above are critical and some are not critical. For example, the heat flux and residence time in cell A of fired heater 40 are not critical as the reaction is proceeding only at a slow rate at the designated preferred low temperatures in cell A. However, the resultant outlet temperature from cell A must be carefully controlled as it is also the inlet temperature to cell B.

Cell B is the most critical section of the heater as the fastest reaction rates occur in the latter portion of cell B. Although the temperatures may not be higher in cell B than in cell C, the concentrations of reactants are higher and the resultant rates of benzene formation and exothermic heat release are highest in cell B. Note that the controlled fast reaction rates in cell B is one of the keys to the economy of this invention. Over .50 percent of the total unit toluene conversion occurs in cell B in a heater tube volume equivalent to only 2 to 4 seconds residence time.

The heat flux supplied to cell B and residence time within the cell B tubes are quite critical. If the temperature exceeds about 1425° F. then under pressures of say 500–1200 p.s.i.g., especially 700–800 p.s.i.g., there is undue reaction which causes or further contributes to nonselective decomposition of the benzene and/or toluene. It is to be realized that in stating the temperature which is the upper limit for the cell B heating it is irrelevant whether this temperature is due to heat supplied from the exothermic reactions per se or heat supplied from a separate source. At the outlet of this second heating zone a continuous quench stream is added to positively control the reaction rate and prevent excessive temperatures that could result in nonselective reactions. For a given cell B tube volume the inlet temperature and heat flux supplied must be carefully controlled to limit the cell B outlet temperature to less than about 1425° F., preferably 1350–1425° F. The cold hydrogen quench is added via line 36. Addition of hydrogen at an earlier stage such as during its passage through the second heated reaction zone, say after about one-third of its passage therethrough is a suitable but less desirable alternate. It is preferred to introduce an initial hydrogen quench immediately after the reaction mixture has undergone passage through a second heated reaction zone and to still later quench the reaction mixture in the third heated reaction zone to further maintain the temperature of the reaction mixture at a controllable level permitting further reaction without excessive nonselective decomposition.

The operating parameters in cell C are not as critical as those in cell B as the concentration of the reactants is considerably lower in cell C. However, another key to the economy of this invention is the positive addition of heat to maintain the reaction temperature and resultant reaction rate at a high controlled level to minimize the required residence time and reactor (fired heater) investment. A further key to the economy of this invention is the simplicity of the cell C design, only one quench point and only one value of heat flux. It is readily apparent that the required residence time to obtain the desired toluene conversion could be further reduced by further increasing the average reaction temperature. This could be done by providing more quench points, each employing a lesser quench amount. The average reaction temperature level could also be increased by dividing cell C into subzones of progressively changing heat flux, i.e. higher values of heat flux to those sections of the heating zone wherein the exothermic reaction rate is lower. The number of quench points to employ and number of heating zones or subzones to provide in cell C is only a design detail, to be decided by economic analysis of the alternate designs.

Note also that cell B could obviously also be equipped with quench point and/or divided into two or more zones with the same or different values of heat flux to increase the controllable average reaction temperature level to permit reducing the residence time required to obtain the desired toluene conversion.

The above specified procedure of carrying out this invention entails in the second and third heating stages or zones (cell B and cell C) positive heating of the reaction mixture and positive cooling so that the exothermic reaction's temperature and rate are maintained in the optimum range for controlled rapid reaction without excessive nonselective decomposition. This method of reaction rate control and the temperature gradient provided thereby is distinctly different from conventional control techniques. Conventional methods maintain a narrow or relatively steady temperature range by controlled cooling or by periodic quenching, whereas it has now been found that a more satisfactory control from a selectivity and economy standpoint is provided by use of the positive addition of heat to speed up the reaction concomitant with the positive addition of a coolant, e.g. cold hydrogen at selected times in the reaction's progress, to limit the maximum reaction temperature. Maximum control of this exothermic reaction is provided therefore not merely by employing a cooling means to counter rising temperatures but rather to positively heat the reaction mixture to obtain a rapid reaction rate within a relatively narrow temperature range limited by positive cooling.

In order to more particularly point out and illustrate the nature of the invention the following example is presented. In the example, temperature is in degrees Fahrenheit, the pressure is in p.s.i.g., and the amounts of material flowing through the various lines are in pounds per hour.

EXAMPLE

Referring to the accompanying schematic flow diagram, about 9357 lbs. per hour of fresh toluene are introduced through line 2. About sixty percent of the toluene so introduced to the process flows through line 2 and enters the recycle gas absorber at 3. The balance of the toluene enters the recycle gas absorber 4 as lean oil entering through line 88. About 1,282 lbs. per hour make-up gas from a petroleum refining process of which hydrogen is about 78 percent by volume, the balance of the ingredients being low molecular weight alkanes principally, are introduced via line 8 into hydrogen purification unit 10. There is also introduced into line 8 at a rate of 2,732 lbs. per hour some recycle hydrogen containing some benzene and toluene which flows from the recycle gas absorber 4 via line 90. About 708 lbs. per hour of a biphenyl rich recycle are also introduced into recycle gas absorber via line 38. This steam contains 499 lbs./hr. of diluent recycle toluene. Into the recycle gas absorber 4, there is also introduced via line 6 hydrogen gas together with a quantity of methane and small amounts of ethane, the charge of these ingredients to recycle gas absorber 4 being about 2,870 lbs. per hour. The liquid reaction feed mixture is withdrawn from recycle gas absorber 4 in line 42 at about 10,213 lbs. per hour. The amount of biphenyls in line 42 is about 2.0 weight percent. Hydrogen rich gas from lines 28 and 31 is introduced into line 42 at a rate of 3531 lbs. per hour to adjust the $H_2$/toluene mol ratio at about 5:1. The reaction mixture passes to heat exchanger 46 exchanging heat with reaction effluent passing through the exchanger in line 48 thus cooling the reaction effluent and heating the unreacted reaction mixture in line 42. The reaction mixture passes through the convection portion 52 of fired heater 40 in line 50. The convection section of heater 40 serves as an economizer to raise the temperature of the reaction mixture closer to the threshold temperature for the conversion of the toluene to benzene. The reaction mixture enters cell A of heater 40 maintained with an average heat flux of 15,000 B.t.u./hr./ft.$^2$ applied to the reaction mixture in line 50, the reaction mixture being heated to a temperature of about 1280° F. and under a pressure of about 750 p.s.i.g. before entering line 53. Line 53 which extends through cell B is also heated, the temperature of the reaction mixture in line 53 within cell B rising to a maximum of about 1375° F. and the duration of the passage of the reaction mixture through cell B being about 2.9 seconds. Cell B has an average heat flux of about 330 B.t.u./lb.-mole/sec. The reaction mixture which now contains a large proportion of benzene passes into a third heated reaction zone designated as cell C of heater 40. Between cell B and cell C there is introduced into the reaction mixture a cold hydrogen rich gas quench at about 150° F. via line 36, the hydrogen being introduced at a rate of about 317 lbs. per hour to quench the reaction mixture to 1320° F. The reaction mixture passes through cell C within 4.0 seconds, exiting at a temperature of about 1,375° F. Cell C has an average heat flux of about 100 B.t.u./lb.-mole/sec. The reaction mixture is also quenched with an additional amount of hydrogen rich gas after about 45 percent of its passage through cell C to reduce the temperature of the reaction mixture from about 1375° F. down to about 1335° F. This hydrogen rich gas enters the reaction mixture through line 34 at a rate of about 293 lbs. per hour. The so quenched reaction mixture temperature rises back to about 1375° F. at the outlet of heater 40. The reaction mixture leaves heater 40 under pressure of about 700 p.s.i.g. in line 48 at a rate of about 14,396 lbs. per hour. Excess quench gas at a rate of 720 lbs. per hour is now introduced via line 32. The total mixture or effluent then passes through waste heat boiler 54, thence through heat exchanger 46 both of which serve to cool the reaction mixture effluent, the latter of which serving to heat the reaction mixture in line 42 being passed to heater 40. The reaction mixture effluent has a temperature at this stage between 267 and 340° F. The thus cooled reaction mixture is still further cooled by passage through air cooler 56 and 140° F. The reaction mixture effluent then passes through a cooler 58 being cooled to 100° F. and thence into flash drum 60 under pressure of 655 p.s.i.g. Hydrogen and substantial quantities of methane, about one-third by volume, together with ethane and some benzene is discharged out of the top of flash drum 60 into line 66. A portion of this mixture passes through line 6 and enters recycle gas absorber 4 where most of the benzene is scrubbed out with toluene. The balance of the mixture enters line 70 and thence line 18 at a rate of 3004 lbs. per hour or its way to recycle compressor 26. The heavier hydrocarbons containing the product benzene, toluene and biphenyls and some aromatics of the C8 class plus some dissolved hydrogen and light hydrocarbons pass out flash drum 60 into line 62 and enter product stripper 64 at a temperature of 100° F. and rate of 9094 lbs./hr. The reboiled product stripper 64 is operated at about 110 p.s.i.g. Hydrogen and light hydrocarbons such as methane and ethane which may not have been separated in the flash drum 60 pass out line 72 at a temperature of about 104° F. at a rate of 77 lbs./hr. from product stripper 64 and may be routed either to fuel gas or for recovery of the small equilibrium benzene content. The balance of the ingredients are removed from product stripper 64 into line 74 at a rate of 8612 lbs./hr. and pass through cooler 76 into line 80. The material in line 80 is adjusted to a temperature lower than the boiling point of the lowest fraction and is clay treated with attapulgus clay in clay treater 81. The clay treated material enters fractionation section 82 which separates benzene product as a liquid sidestream in line 87 at a rate of 7218 lbs./hr. A vapor sidestream containing biphenyls and xylene is withdrawn in line 38 and enters recycle gas absorber 4 as recycle. Heavy aromatic bottoms are rejected from the fractionation section in line 89 at a rate of 478 lbs./hr. Toluene is withdrawn as a liquid sidestream and a portion recycled to toluene feed line 2. The balance is injected into line 38 to prevent solidification of any recycle biphenyls. In so doing about 8612 lbs. per hour of a benzene-toluene mixture containing biphenyl is produced prior to fractionation in the fractionation section 82. The charge to the compressor 26 contains about 79 percent by volume hydrogen and passes to the compressor 26 at a rate of about 4,891 lbs. per hour. This gas composition leaves compressor 26 and enters line 28. The hydrogen quench passing through lines 32, 34 and 36 are, as shown in the accompanying schematic diagram, fed by this quench line 28. The reaction selectivity is about 97 percent and the toluene conversion is 90 percent.

It is readily seen from the foregoing that the instant invention provides a commercially feasible and economically suitable method for preparing benzene from toluene. Specifically, it can be seen that this process provides a high selectivity of the order of about 97 percent and minimizes the production of undesirable by-products.

The terms and expressions which have been employed are used as terms of description and not of limitation, as there is no intention, in the use of such terms and expressions, or excluding any equivalents of the features shown and described or portions thereof, but it is recognized that various modifications are possible within the scope of the invention claimed. It should be realized for instance that one or more separate heated reaction zones can be employed and that these zones need not be within the same heater as separate heaters can be employed for separated heated reaction zones. In some instances one heated reaction zone with different heat fluxes therein can be used. Furthermore, it is not absolutely necessary in the performance of the process of the invention that a fired heater be used so long as there is some means for providing the heat fluxes specified. Also, more quench points could be used.

It should be remembered that the process can be used for converting xylenes to benzene by passing the xylene through a first dealkylation step to produce toluene and processing the toluene to produce benzene or by introducing xylene directly to the heater for conversion to benzene directly from a xylene feed. Ethylbenzene can be thermally dealkylated by this process to toluene and/or benzene without varying the manipulative procedures of this invention.

Means other than a cryogenic hydrogen purification unit can obviously be used to reject the methane formed in the reaction. Absorption, adsorption, or other systems can be employed to separate methane from the hydrogen in the flash drum gas, or flash gas can be vented from the system in sufficient quantity to eliminate the methane formed in the reaction.

We claim:

1. A process for producing benzene from an aromatic reactant which comprises:
    (a) passing a reaction mixture consisting essentially of hydrogen and an aromatic reactant selected from the group consisting of toluene, xylene and ethylbenzene through a heating zone in a fired heater having an average heat flux applied to the heater tubes containing the reaction mixture of between 12,000 and 20,000 B.t.u./hr./ft.$^2$ to reach a reaction initiating temperature of 1150 to 1325° F.;
    (b) passing the reaction mixture through a second heated reaction zone having a heat flux applied to the heater tubes containing the reaction mixture of between 200 and 500 B.t.u./lb.-mole/sec. for a period of between 2.0 and 4.0 seconds while increasing the temperature of the reaction mixture to between 1325 and 1425° F. at the outlet of the second heated reaction zone, the temperature of the reaction mixture leaving said second heated reaction zone being controlled by admitting hydrogen quench into the reaction mixture upon its leaving the second heated reaction zone;
    (c) passing the reaction mixture through a third heated reaction zone having a heat flux applied to the heater tubes containing the reaction mixture of between 50 and 250 B.t.u./lb.-mole sec. for a period of between 3.5 and 5.0 seconds while maintaining the temperature of the reaction mixture between 1250 and 1425° F., the temperature of the reaction mixture in said third heated reaction zone being controlled by admitting hydrogen quench into the reaction mixture during reaction in the third heated reaction zone; and
    (d) withdrawing the reaction mixture from the third heated reaction zone, cooling, and recovering benzene at a selectivity greater than 95%.

2. A process according to claim 1 wherein toluene is the aromatic reactant, the heat flux applied the heater tubes containing the reaction mixture in the first heating zone is between 12,000 and 20,000 B.t.u./hr./ft.$^2$ to reach a reaction initiating temperature of 1250 to 1300° F., the heat flux applied to the heater tubes containing the reaction mixture in the second heated reaction zone is between 300 and 400 B.t.u./lb.-mole/sec., the period of passage of the reaction mixture through the second heated reaction zone is between 2.8 and 3.3 seconds, the temperature of the reaction mixture at the outlet of the second heated reaction zone is between 1350 and 1400° F., the heat flux applied to the heater tubes containing the reaction mixture in the third heated reaction zone is between 75 and 150 B.t.u./lb.-mole/sec., the period of passage of the reaction mixture through the third heated reaction zone is between 3.7 and 4.3 seconds, the temperature of the reaction mixture in the third heated reaction zone does not exceed 1425° F. and the hydrogen to toluene mol ratio in the feed to the first heated reaction zone is between 4 and 6.

3. A process according to claim 2 wherein a biphenyls rich fraction produced according to the process is recycled together with the toluene-hydrogen feed.

4. A process according to claim 3 wherein the reactants pass through a convection section of a heater prior to being introduced into the first heated reaction zone.

5. A process according to claim 3 wherein residence time in the second heated reaction zone is reduced to less than 2.8 seconds by employing at least one intermediate quench and a heat flux greater than 400 B.t.u./lb.-mole/sec.

6. A process according to claim 3 wherein residence time in the second heated reaction zone is reduced to less than 2.8 seconds by employing at least one intermediate quench and dividing the heating zone into at least two subzones having different heat flux values.

7. A process according to claim 3 wherein the residence time in the third heated reaction zone is reduced by employing at least one intermediate quench and dividing the heating zone into at least two subzones having different heat flux values.

8. A process according to claim 3 wherein the residence time in the second heated reaction zone is reduced by employing at least one intermediate quench, a heat flux greater than 400 B.t.u./lb.-mole/sec., and by dividing the heating zone into at least two subzones having different heat flux values and wherein the residence time in the third heated reaction zone is reduced by employing at least one intermediate quench therein and dividing the third heated zone into at least two subzones having different heat flux values.

9. A process according to claim 8 wherein a xylene is the aromatic reactant.

10. A process according to claim 8 wherein ethylbenzene is the aromatic reactant.

(References on following page)

References Cited

UNITED STATES PATENTS

| | | | |
|---|---|---|---|
| 3,171,862 | 3/1965 | Larkins et al. | 260—672 |
| 3,192,281 | 6/1965 | Corneil | 260—672 |
| 3,193,595 | 6/1965 | Kenton et al. | 260—672 |
| 3,225,111 | 12/1965 | Lehrian | 260—672 |
| 3,288,875 | 11/1966 | Payne et al. | 260—672 |
| 3,296,323 | 1/1967 | Myers et al. | 260—672 |
| 3,374,280 | 3/1968 | Carr et al. | 260—672 |
| 3,390,280 | 6/1968 | Sze | 260—672 |

DELBERT E. GANTZ, Primary Examiner

G. E. SCHMITKONS, Assistant Examiner

U.S. Cl. X.R.

208—48

PO-1050
(5/69)

UNITED STATES PATENT OFFICE
CERTIFICATE OF CORRECTION

Patent No. 3,531,537  Dated September 29, 1970

Inventor(s) Randlow Smith and Dale Williams

It is certified that error appears in the above-identified patent and that said Letters Patent are hereby corrected as shown below:

Column 3, line 48, "30 and 500" should read --300 and 400--. Column 7, line 58, "steam" should read --stream--. Column 8, line 53, "or" should read --on--; line 56 "C8", should read --$C_8$--. Column 10, line 8, "B.t.u./lb.-mole sec." should read --B.t.u./lb.-mole/sec.--.

Signed and sealed this 6th day of April 1971.

(SEAL)
Attest:

EDWARD M. FLETCHER, JR.
Attesting Officer

WILLIAM E. SCHUYLER, JR.
Commissioner of Patents